Figure 1:
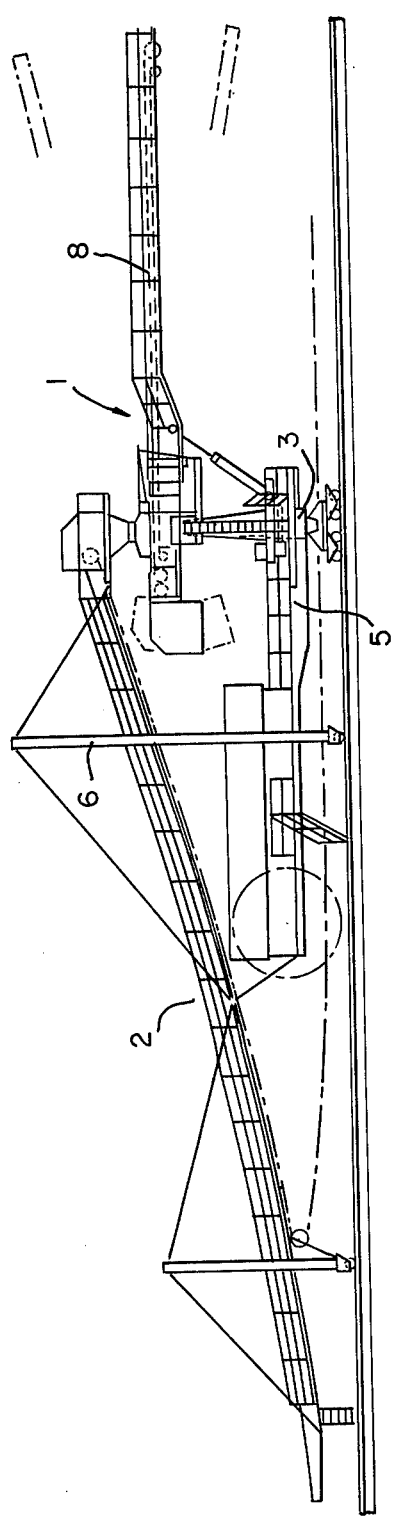

United States Patent [19]

Kipper

[11] 4,319,677
[45] Mar. 16, 1982

[54] STOCKYARD TRANSPORTER AND TRIPPER CAR EQUIPMENT

[75] Inventor: Hans Kipper, Blieskastel, Fed. Rep. of Germany

[73] Assignee: PHB-Weserhutte AG, Fed. Rep. of Germany

[21] Appl. No.: 191,987

[22] Filed: Sep. 29, 1980

[51] Int. Cl.³ .............................................. B65G 37/00
[52] U.S. Cl. .................................... 198/585; 414/133
[58] Field of Search ............... 198/585, 588, 594, 508; 414/133

[56] References Cited

U.S. PATENT DOCUMENTS

| Re. 29,110 | 1/1977 | Oury | 198/588 |
| 2,748,918 | 5/1956 | Mercier | 198/585 |
| 3,251,449 | 5/1966 | Hoppmann | 198/585 |
| 3,297,141 | 1/1967 | Janitsch | 198/585 |
| 3,314,525 | 4/1967 | Krause | 198/586 |
| 3,348,662 | 10/1967 | Pradon | 198/585 |
| 4,054,213 | 10/1977 | Chever | 414/133 |
| 4,260,050 | 5/1981 | Becker | 198/585 |

FOREIGN PATENT DOCUMENTS 1079865 12/1954 France ............................... 198/588

Primary Examiner—Robert B. Reeves
Assistant Examiner—Brian Bond
Attorney, Agent, or Firm—Karl W. Flocks

[57] ABSTRACT

This invention relates to stockyard transporter and tripper car equipment which is movable on rail disposed on both sides, comprising portal uprights provided with running gears, a tripper car frame and a boom, which is mounted so that it can be lifted and lowered and/or rotated. Here the stockyard transporter is supported in the tripper car substantially without a counterweight.

4 Claims, 3 Drawing Figures

STOCKYARD TRANSPORTER AND TRIPPER CAR EQUIPMENT

Known equipment of this kind comprises four uprights, which are provided with individual running gears. The tripper car consists of a separate unit and is provided with two supports.

In another known design with three-point support, the base width equals the rail gauge and the tripper car is separately suspended. Particularly with rotatable stockyard transporters for placing material at two places on both sides of the track, this has disadvantageous results regarding structural expenditure and stability. Owing to the loss of space, the stability of systems supported at three points can be ensured only by a portal structure having a large wheel spacing, a heavy counterweight and a plurality of expensive running gears.

It is an object of the invention to provide a more economical solution for equipment of the kind described first hereinbefore, to provide a more compact arrangement and greatly to improve the stability of the equipment.

This object is accomplished in accordance with the invention in that the stockyard transporter and tripper car constitute a mobile, rail-bound unit, the stockyard transporter is supported in the tripper car substantially without counterweights, only one portal having two uprights is provided at the end remote from the tripper car, and a fixed connection is provided between the portal and one vertical support of the tripper car so that the tripper car acts substantially like a counterweight to improve the stability of the stockyard transporter.

In a desirable arrangement, the fixed connection is rigid with the portal and pivoted to the vertical support of the tripper car.

The connection between the portal and the vertical support of the tripper car is preferably centrally disposed.

Finally, it may be recommendable to provide a variable distance "a" between the portal and the vertical support so that the load applied to the tripper car is sufficient and is proportional to the distance "a", i.e., its proportion increases with the distance "a".

A diagrammatically shown, illustrative embodiment of the invention will be explained more fully hereinafter.

Figure 2:
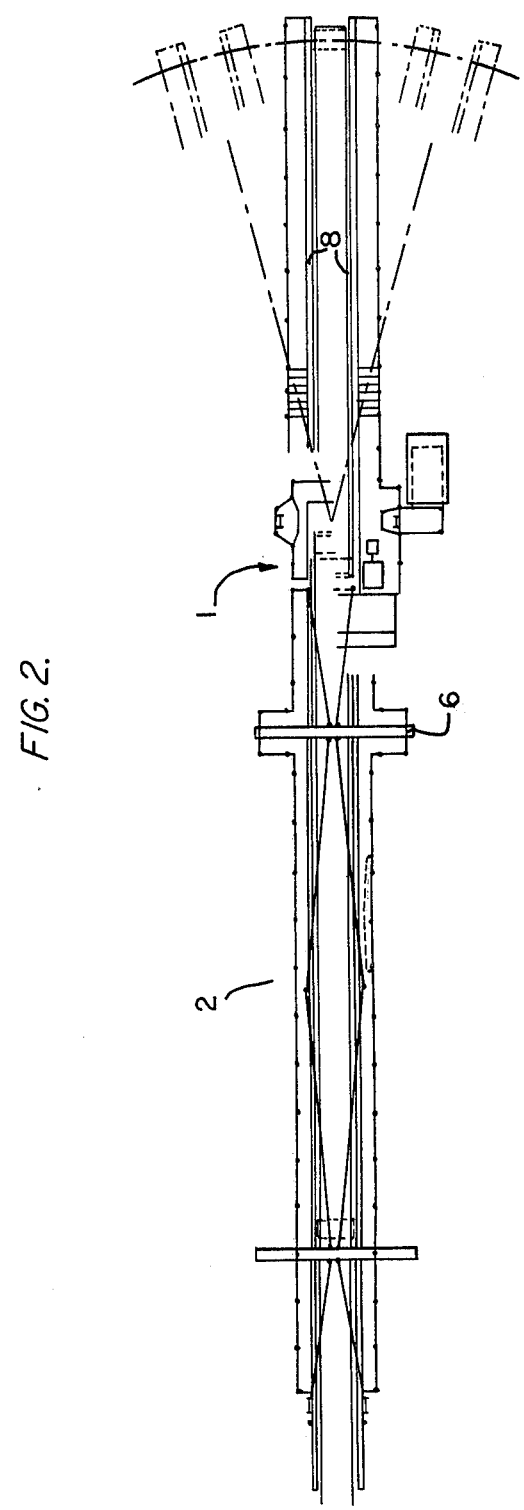
Figure 3:
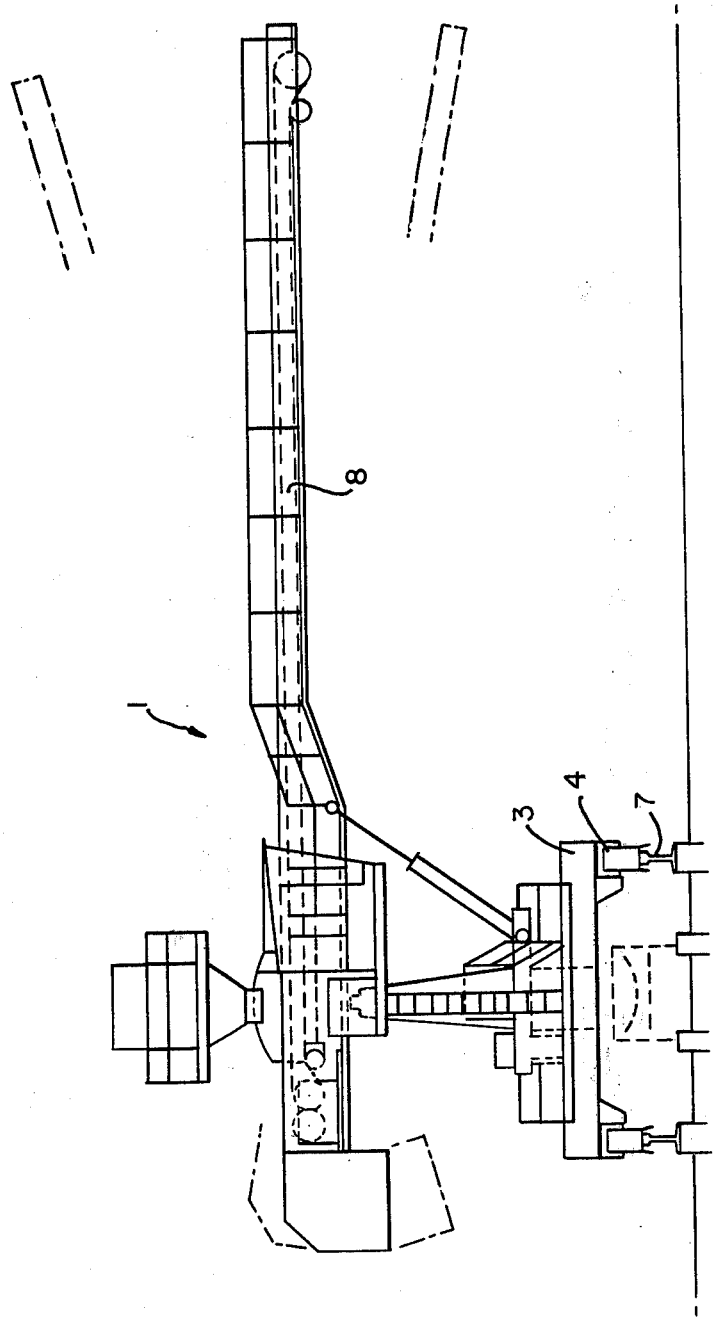

In the drawing,

FIG. 1 is a front elevation showing the equipment,
FIG. 2 is an associated top plan view and
FIG. 3 an associated side elevation.

The stockyard transporter 1 is provided on one side with a portal 3, which has two uprights 4 with running gears 7. The stockyard transporter 1 is connected by a fixed, preferably centrally disposed connection 5 to the tripper car 2. The connection 5 ist rigid with the portal 3 and is pivoted at the other end to the vertical support 6 of the tripper car.

The stockyard transporter and tripper car equipment is also provided with a boom 8, which is pivotally movable radially and/or liftable and lowerable and can be used to discharge material to dumps disposed on both sides. The boom 8 is provided with counterweights in a conventional manner.

In the arrangement of the stockyard transporter and tripper car in accordance with the invention, the forward support of the tripper car is included in the supporting system of the equipment so that only one portal with two uprights is required. Because two portal uprights with running gears are saved and a simpler structure is obtained, the manufacturing costs are substantially reduced.

Because the stockyard transporter 1 is supported on the tripper car 2 substantially without a counterweight proper, the forces are directly taken up in an axial direction and the load applied can be varied by means of the vertical support 6 of the tripper car 2. For this reason the wheel spacing can be freely selected independently of the gauge so that the control of the stability is improved. The arrangement involves also smaller lateral forces and the drive power, tracks etc. can be provided at lower cost.

I claim:

1. Stockyard transporter and tripper car equipment which is movable on rails disposed on both sides, comprising portal uprights provided with running gears, a tripper car frame and a boom, which is mounted so that it can be lifted and lowered and/or rotated, characterized in that the stockyard transporter (1) and the tripper car (2) constitute a mobile, rail-bound unit, the stockyard transporter (1) is supported in the tripper car (2) substantially without a counterweight, only one portal (3) having two uprights (4) is provided at the end remote from the tripper car (2), and a fixed connection (5) is provided between the portal (3) and one vertical support (6) of the tripper car (2) so that the tripper car acts substantially like a counterweight to improve the stability of the stockyard transporter.

2. Equipment according to claim 1, characterized in that the fixed connection (5) is rigid with the portal (3) and pivoted to the vertical support (6) of the tripper car (2).

3. Equipment according to claim 1 or 2, characterized in that the connection (5) between the portal (3) and the vertical support (6) of the tripper car (2) is centrally disposed.

4. Equipment according to any of claims 1 to 3, characterized in that the distance "a" between the portal (3) and the vertical support (6) is variable so that the load applied to the tripper car (2) is sufficient and proportional to the distance "a", i.e., its proportion increases with the distance "a".

* * * * *